United States Patent [19]
Ogawa et al.

[11] Patent Number: 5,701,245
[45] Date of Patent: Dec. 23, 1997

[54] SUSPENSION CONTROL SYSTEM

[75] Inventors: Kazuo Ogawa, Nagoya; Takaaki Enomoto, Anjou; Masato Kawai; Minoru Kato, both of Toyota; Kunihito Sato, Mishima, all of Japan

[73] Assignee: Toyota Jidosha Jabushiki Kaisha, Toyota, Japan

[21] Appl. No.: 540,013

[22] Filed: Oct. 6, 1995

[30] Foreign Application Priority Data

Oct. 7, 1994 [JP] Japan .................. 6-270400

[51] Int. Cl.$^6$ .................. B60G 17/015
[52] U.S. Cl. .................. 364/424.046; 280/707
[58] Field of Search .................. 364/424.046, 424.047; 280/707, 840; 267/136

[56] References Cited

U.S. PATENT DOCUMENTS

| | | | |
|---|---|---|---|
| 4,742,998 | 5/1988 | Schubert | 267/136 |
| 4,907,154 | 3/1990 | Yasuda et al. | 364/424.046 |
| 5,322,320 | 6/1994 | Sahashi et al. | 280/707 |
| 5,324,069 | 6/1994 | Ogawa | 280/707 |
| 5,428,533 | 6/1995 | Ogawa | 280/707 |
| 5,445,405 | 8/1995 | Onozawa et al. | 280/707 |

FOREIGN PATENT DOCUMENTS

| | | |
|---|---|---|
| 3-276808 | 12/1991 | Japan . |
| 4-24111 | 1/1992 | Japan . |
| 5-69720 | 3/1993 | Japan . |
| 5-294122 | 11/1993 | Japan . |

*Primary Examiner*—Gary Chin
*Attorney, Agent, or Firm*—Cushman, Darby & Cushman IP Group of Pillsbury Madison & Sutro LLP

[57] ABSTRACT

A suspension control system of the present invention varies a damping force according to a velocity ratio of a mass-body velocity to a relative velocity, while ensuring both a comfortable drive and stable cruising. In the suspension control system, a CPU calculates a mass-body velocity Zd and a relative velocity Yd based on detection signals from sensors and determines a velocity ratio Zd/Yd (steps S110 and S120). A small skyhook damping coefficient is set for a small vehicle speed V to reduce a damping force according to the velocity ratio Zd/Yd (step S130). In the process of varying the damping force, a stepping motor used for the variation in damping force is driven at a low driving frequency for a small vehicle speed V (step S180). While the vehicle runs at a relatively low speed, the suspension control system of the invention restricts the degree of variation in damping force and lowers the rate of variation in damping force, thereby relieving shocks or uncomfortableness due to a delayed control of damping force, which is caused by a delayed detection of the relative velocity or a delayed response of devices and substantially maintaining a drive.

7 Claims, 8 Drawing Sheets

SUSPENSION CONTROL SYSTEM

BACKGROUND OF THE INVENTION

1. Field of the Invention

The present invention relates to a suspension control system for supporting a mass body on a support base of a vehicle to allow a variation in damping force. More specifically, the invention pertains to a suspension control system for varying and controlling a damping force according to a velocity ratio of a vertical velocity of the mass body in a vertical direction to a relative velocity of the mass body and the support base in the vertical direction.

2. Description of the Related Art

Such suspension control systems generally vary and control the damping force based on a skyhook control theory as proposed in JAPANESE PATENT LAID-OPEN GAZETTE No. H3-276808. A skyhook damper is constructed to vary and control the damping force according to a velocity ratio of a vertical velocity of a mass body in a vertical direction (hereinafter referred to as the mass-body velocity for the convenience of explanation) to a relative velocity of the mass body and the support base in the vertical direction (hereinafter referred to as the relative velocity). This enhances the restraining effect of vertical vibrations of the mass body based on an input road surface condition. The concrete process of varying the damping force is given below.

In a shock absorber for supporting the vehicle, an upper oil chamber and a lower oil chamber are opposed to each other across a piston, which is provided with an oil conduit for connecting the upper oil chamber with the lower oil chamber. The oil conduit has a variable degree of opening. A quantity of operating oil running through the oil conduit of the piston and flown into the upper and the lower oil chambers is controlled by varying the degree of opening of the oil conduit. Adjustment of the opening degree of the oil conduit results in varying the damping force. The greater opening degree of the oil conduit increases the quantity of operating oil flown between the upper and the lower oil chambers, thereby changing the damping force to a softer state. The smaller opening degree, on the other hand, decreases the quantity of operating oil, thereby changing the damping force to a harder state.

The opening degree of the oil conduit is determined by the velocity ratio and adjusted by regulating a valve travel of a valve disposed in the oil conduit. A stepping motor is generally used to actuate such a valve, because of its advantages in the mountability on the vehicle, weight, and easy maintenance. Every time when the damping force is to be varied according to the cruising condition of the vehicle, the stepping motor is driven to decrease or increase the current damping force to a desired level.

The following problems, however, arise in the conventional suspension control systems, which control the dumping force based on the skyhook control theory.

For example, it is assumed that the mass-body velocity is positive in upward direction and negative in downward direction and that the relative velocity is positive in the expanding process of the shock absorber and negative in the contracting process. In the skyhook control theory, when the mass-body velocity and the relative velocity have opposite signs to give a negative velocity ratio (that is, when a positive mass-body velocity and a negative relative velocity or alternatively a negative mass-body velocity and a positive relative velocity give a negative velocity ratio), the dumping force of the shock absorber acts as a vibration-increasing force on the mass body. Under such condition, the dumping force is reduced to its lower limit (Full Soft) to quickly compensate and absorb the vibrations.

When the mass-body velocity and the relative velocity have identical signs to give a positive velocity ratio (that is, when positive mass-body velocity and relative velocity or alternatively negative mass-body velocity and relative velocity give a positive velocity ratio), on the other hand, the dumping force of the shock absorber acts as a vibration-controlling force on the mass body. Under such condition, the dumping force is set in a harder state in response to the velocity ratio so as to dump vibrations on the mass body. When the velocity ratio exceeds a predetermined positive value, the dumping force is increased to its maximum (Full Hard). It is preferable in the skyhook control theory to change the damping force from Full Soft to Hard at a zero-cross point where the sign of the relative velocity is inverted.

Output of detection signals from various sensors for calculation of the relative velocity is slightly delayed from the actual displacement of the objects to be measured. There is also a response delay of devices in a variation of the damping force by means of a stepping motor or another actuator. The actual change of the damping force from Full Soft to Hard is thus delayed to some extent from the zero-cross point of the relative velocity. When the damping force is changed from Full Soft to Hard during a low-speed cruising on a relatively rough road surface having a high-frequency variation, for example, the shoulder of a road, the desired degree of variation in damping force can not be attained at the desired timing. Such a variation in damping force abruptly changes the flow of operating oil running through the oil conduit of the piston, thereby causing shocks or discomfort to a driver or passengers and worsening the comfort of the drive or ride of the vehicle.

SUMMARY OF THE INVENTION

The object of the present invention is thus to vary a damping force according to a ratio of a mass-body velocity to a relative velocity, while ensuring both a comfortable drive and stable cruising.

The above and the other related objects are realized by a suspension control system for controlling suspension means disposed between a mass body and a support base of a vehicle for supporting the mass body on the support base, the system including:

control means for varying and controlling a damping force of the suspension means according to a velocity ratio of a velocity of the mass body in a vertical direction to a relative velocity of the mass body and the support base in the vertical direction, the control means comprising:

vehicle speed detection means for detecting a speed of the vehicle; and damping force correction means for adjusting the damping force, which is varied and controlled according to the velocity ratio, in response to the vehicle speed detected by the vehicle speed detection means so as to give a lower damping force at a lower vehicle speed.

In the suspension control system thus constructed, the control means varies and controls the damping force of the suspension means according to a velocity ratio of a vertical velocity of a mass body in a vertical direction (hereinafter referred to as the mass-body velocity) to a relative velocity of the mass body and the support base in the vertical direction (hereinafter referred to as the relative velocity).

The damping force of the suspension means is, however, not uniformly varied according to the velocity ratio. The damping force correction means adjusts, more specifically, increases or decreases the damping force in response to the vehicle speed so as to give a lower damping force at a lower vehicle speed.

While the vehicle runs at a relatively low speed, this structure decreases the damping force according to the velocity ratio and restricts the degree of variation in damping force. In low-speed cruising when the driver is relatively sensitive to drive comfort, the controlled variation in damping force results in relieving shocks or uncomfortableness due to a delayed control of damping force, which is caused by a delayed detection of the relative velocity or a delayed response of devices. In high-speed cruising when the driver is more caught by the speed but relatively insensitive to drive comfort, on the contrary, the suspension control system of the invention varies the damping force to a greater extent than that for the low-speed cruising to be suited for the velocity ratio, thus realizing stable cruising. In this manner, the suspension control system of the invention ensures both a comfortable to drive and a stable cruising.

According to one preferable application, the damping force correction means is provided with damping coefficient change means for adjusting a damping coefficient of the suspension means in response to the vehicle speed so as to give a smaller damping coefficient at a lower vehicle speed. The adjusted damping coefficient increases or decreases the damping force in response to the vehicle speed in such a manner that a lower damping force is applied at a lower vehicle speed.

It is preferable that the damping force correction means further includes damping coefficient selection means for selecting a small damping coefficient with respect to vehicle speeds lower than a predetermined value and a large damping coefficient with respect to vehicle speeds higher than the predetermined value. This structure allows the damping force to increase or decrease according to the vehicle speed by simple selection of the appropriate damping coefficient.

The invention is also directed to a suspension control system for controlling suspension means disposed between a mass body and a support base of a vehicle for supporting the mass body on the support base; the system including:

control means for varying and controlling a damping force of the suspension means according to a velocity ratio of a velocity of the mass body in a vertical direction to a relative velocity of the mass body and the support base in the vertical direction, the control means comprising:

vehicle speed detection means for detecting a speed of the vehicle;

an actuator for causing the damping force in response to a given driving signal; and frequency reduction means for, when the damping force is varied and controlled according to the velocity ratio, decreasing a driving frequency of a driving signal in response to the vehicle speed detected by the vehicle speed detection means so as to give a lower driving frequency at a lower vehicle speed.

The suspension control system thus constructed does not drive the actuator at a uniform frequency of driving signal for varying and controlling the damping force according to the velocity ratio. The frequency reduction means reduces the driving frequency of driving signal of the actuator in response to the vehicle speed so as to give a lower driving frequency at a lower vehicle speed.

While the vehicle runs at a relatively low speed, this structure drives the actuator at a low driving frequency to vary to the damping force according to the velocity ratio, thereby lowering the rate of variation in damping force. In low-speed cruising, the lowered rate of variation in damping force results in relieving shocks or uncomfortableness due to a delayed control of damping force, which is caused by a delayed detection of the relative velocity or a delayed response of devices. In high-speed cruising when the driver is relatively insensitive to drive comfort, on the contrary, the suspension control system of the invention drives the actuator at a high driving frequency to quickly vary the damping force, thus realizing stable cruising. In this manner, the suspension control system of the invention ensures both a comfortable drive and stable cruising.

In accordance with one preferable Structure, the frequency reduction means is provided with reduction means for decreasing the driving frequency to a low driving frequency irrespective of the vehicle speed detected by the vehicle speed detection means, when the damping force is decreased according to the velocity ratio. The gentle decrease of the damping force does not abruptly change the comfort of the drive, nor cause discomfort to the driver or passengers.

The invention is further directed to a suspension control system for controlling suspension means disposed between a mass body and a support base of a vehicle for supporting the mass body on the support base; the system including:

control means for varying and controlling a damping force of the suspension means to a first damping force according to a velocity ratio of a velocity of the mass body in a vertical direction to a relative velocity of the mass body and the support base in the vertical direction, the control means comprising:

driving condition detecting means for detecting a driving condition causing a change of attitude of said vehicle;

attitude change compensating means for varying and controlling the damping force of the suspension means to a second damping force in response to the driving condition detected by the driving condition detecting means;

an actuator for causing the damping force in response to a given driving signal; and frequency variation means for, when the damping force is varied and controlled to the second damping force by the attitude change compensating means, changing a driving frequency of the driving signal to a second driving frequency, which is higher than a first driving frequency applied for varying the damping force to the first damping force.

The suspension control system thus constructed does not uniformly control the damping force of the suspension means according to the velocity ratio. The driving condition detecting means detects a driving condition causing a change of attitude of the vehicle. In order to control the attitude change, the attitude change compensating means varies and controls the damping force of the suspension means to a second damping force in response to the detected driving condition. While the attitude change compensating means varies the damping force, the frequency variation means changes the driving frequency of driving signal, at which an actuator is driven for a variation in damping force. In response to such a driving condition as to cause an attitude change of the vehicle, the suspension control system varies the damping force and changes the driving frequency of the actuator to the second driving frequency, which is higher than a first driving frequency applied for varying the damping force according to the velocity ratio.

When carrying out such an operation as to cause an attitude change of the vehicle, the driver concentrates on the operation and is rather insensitive to the comfort of the drive. Under such condition, the suspension control system drives the actuator at a higher second driving frequency to quickly change the damping force to the second value, thus ensuring stable cruising. When the driver does not carry out any operation to cause an attitude change of the vehicle and is relatively sensitive to the comfortable of the drive, the suspension control system drives the actuator at lower first driving frequency to change the damping force to the first value. The lowered rate of variation in damping force results in relieving shocks or uncomfortableness due to a delayed control of damping force, which is caused by a delayed detection of the relative velocity or a delayed response of devices. In this manner, the suspension control system of the invention ensures both a comfortable drive and stable cruising.

According to one preferable application, the frequency variation means is further provided with:

damping force comparison means for comparing the first damping force with the second damping force; and frequency switching means for, when the first damping force is greater than the second damping force, setting the driving frequency of the driving signal equal to the second driving frequency until the damping force of the suspension means reaches the second damping force, and setting the driving frequency equal to the first driving frequency until the damping force of the suspension means exceeds the second damping force to reach the first damping force.

In this structure, even when the first damping force according to the velocity ratio is greater than and predominant over the second damping force according to the driving condition, the actuator is driven quickly at the higher second driving frequency until the damping force changes to the second damping force. The actuator is then driven slowly at the lower first driving frequency until the damping force reaches the first damping force. The swift change of the damping force to the driving condition-based second damping force and the slow change to the velocity ratio-based first damping force further ensure both a comfortable to drive and stable cruising.

The suspension control system of this structure preferably includes vehicle speed detection means for detecting a speed of the vehicle. It is preferable that the frequency switching means includes frequency reduction means for, when the driving frequency of the driving signal is changed from the second driving frequency to the first driving frequency, decreasing the first driving frequency in response to the vehicle speed detected by the vehicle speed detection means so as to give a lower driving frequency at a lower vehicle speed.

In this structure, the first driving frequency is reduced under the condition of low vehicle speed while the damping force changes from the driving condition-based second damping force to the velocity ratio-based first damping force. The swift change of the damping force to the driving condition-based second damping force and the slow change to the velocity ratio-based first damping force under the condition of low vehicle speed further ensure both comfortable to drive and stable cruising.

Another suspension control system according to the present invention, for controlling suspension means disposed between a mass body and a support base of a vehicle for supporting the mass body on the support base, includes:

vertical velocity detection means for detecting a vertical velocity of the mass body in a vertical direction;

relative velocity detection means for detecting a relative velocity of the mass body and the support base in the vertical direction;

control means for varying and controlling a damping force of the suspension means according to a velocity ratio of the vertical velocity detected by the vertical velocity detection means to the relative velocity detected by the relative velocity detection means;

relative velocity correction means for, when the relative velocity detected by the relative velocity detection means varies from a predetermined reference value toward zero, correcting the detected relative velocity in a direction of the variation, so as to allow the corrected relative velocity to be substantially approximated by zero at a point where the detected relative velocity is equal to the predetermined reference value; and substitution means for substituting the corrected relative velocity for the relative velocity detected by the relative velocity detection means.

In the suspension control system thus constructed, the control means varies the damping force of the suspension means according to the velocity ratio of the vertical velocity detected by the vertical velocity detection means to the relative velocity detected by the relative velocity detection means (hereinafter referred to as the detected relative velocity). The detected relative velocity is, however, not uniformly used for defining the velocity ratio, but the substitution means substitutes the relative velocity corrected by the relative velocity correction means for the detected relative velocity.

When the detected relative velocity varies from a predetermined reference value toward zero, the relative velocity correction means corrects the detected relative velocity in a direction of the variation, so as to allow the corrected relative velocity to be substantially approximated by zero at a point where the detected relative velocity is equal to the predetermined reference value.

The corrected relative velocity given by the relative velocity correction means is approximated by zero before the detected relative velocity changes to zero but does not reach zero. The corrected relative velocity changes in a certain direction to cross zero (for example, from positive to negative) prior to the detected relative velocity. This means that the zero-cross point of the corrected relative velocity comes before the zero-cross point of the detected relative velocity. This allows the timing of variation in damping force to be coincident with or approximated by the zero-cross point of the detected relative velocity, thereby relieving shocks or uncomfortableness due to a delayed control of damping force, which is caused by a delayed detection of the relative velocity or a delayed response of devices, and maintaining a comfortable drive. The variation in damping force according to the velocity ratio does not damage the stable cruising. In this manner, the suspension control system of the invention ensures both a comfortable drive and stable cruising.

In accordance with one preferable application, the relative velocity correction means includes:

variation rate distinction means for calculating a variation rate of the relative velocity detected by the relative velocity detection means and reading a sign of the variation rate; and correction means for adding the predetermined reference value to the relative velocity detected by the relative velocity detection means in response to the sign of the variation rate, thereby correcting the detected relative velocity.

This structure corrects the detected relative velocity by a relatively simple process, that is, calculating a variation rate, reading a sign of the variation rate, and executing addition of the predetermined reference value in response to the sign of the variation rate.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
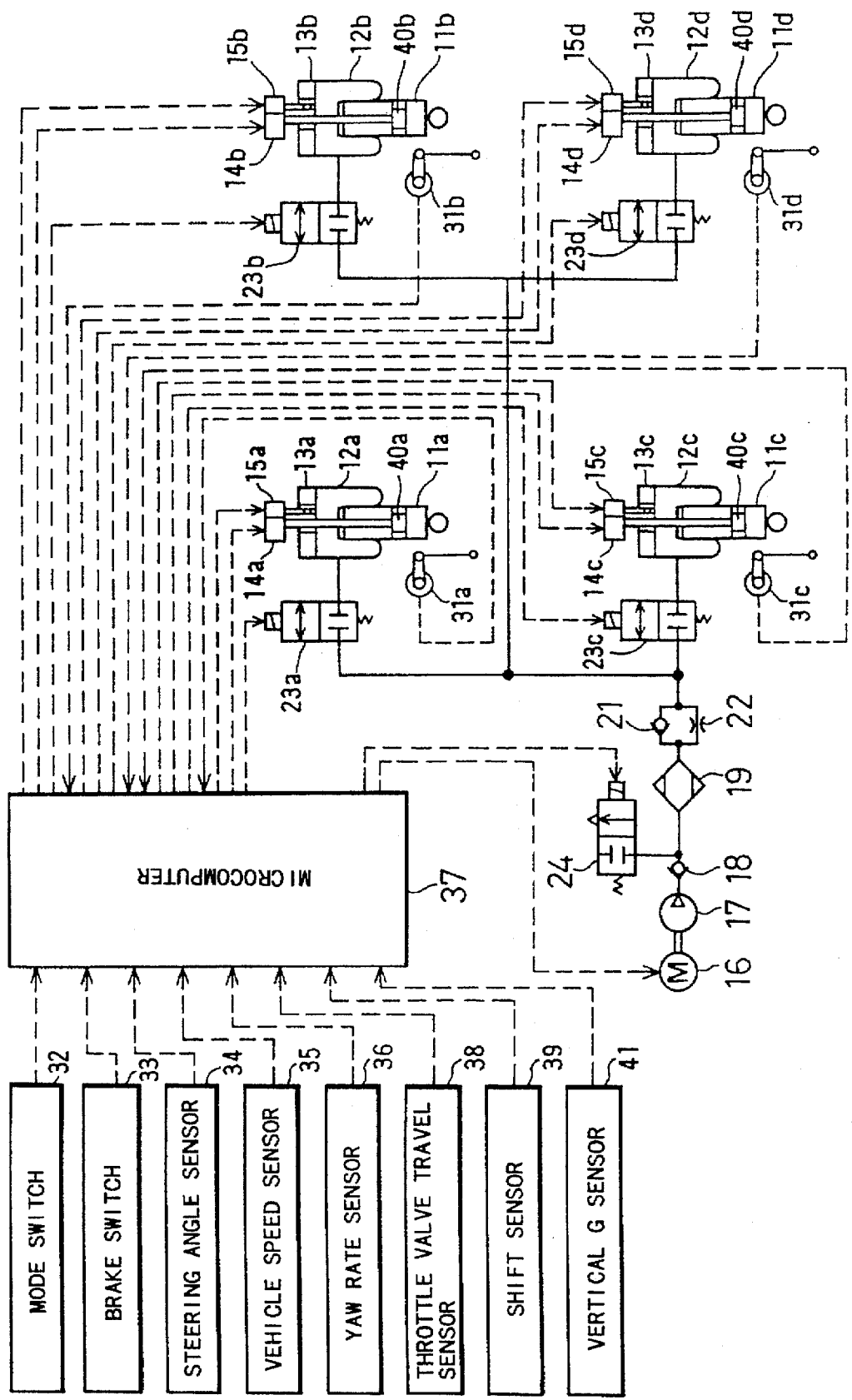
FIG. 1 is a block diagram schematically illustrating a general structure of a suspension control system 10 of a first embodiment according to the invention.

Suspension control systems embodying the invention are described according to the drawings. FIG. 1 is a block diagram schematically illustrating a general structure of a suspension control system 10 of a first embodiment.

The suspension control system 10 includes shock absorbers 11a through 11d, primary air chambers 12a through 12d, and auxiliary air chambers 13a through 13d respectively corresponding to a pair of front wheels and a pair of rear wheels of a vehicle (not shown). Hereafter, supplementary alphabet symbols 'a' through 'd' are added to the corresponding numerals for description of the respective wheels, while being omitted for description in common.

Each shock absorber 11 is disposed between a wheel defined as a support base and a body of the vehicle (not shown) defined as a mass body, and supports the wheel and the body to allow a variation in damping force. The shock absorber 11 is provided with a stepping motor 14, which is an object to be controlled for varying the damping force, and has a built-in damping force-variable mechanism (described below) cooperating with the stepping motor 14. Although the stepping motor 14 is arranged outside the shock absorber 11 for the clarity of illustration in FIG. 1, the stepping motor 14 may be disposed with the damping force-variable mechanism inside the shock absorber 11.

Inside the shock absorber 11, an upper oil chamber and a lower oil chamber are opposed to each other across a piston 40, which has an oil conduit for connecting the upper oil chamber with the lower oil chamber. The oil conduit is provided with a rotary valve, whose valve travel is varied by the stepping motor 14. The shock absorber 11 changes the valve travel of the rotary valve by means of the stepping motor 14, so as to control the quantity of operating oil running through the oil conduit of the piston 40 and flown into the upper and the lower oil chambers. Adjustment of the valve travel varies the damping force relative to a vertical movement of the body in multiple stages (nine stages in this embodiment). The greater valve travel increases the flow of operating oil between the upper and the lower chambers, which results in a softer damping force. The smaller valve travel, on the contrary, decreases the flow of operating oil and generates a harder damping force.

Each primary air chamber 12 has an air chamber of variable volume to allow a body height at the position of the corresponding wheel to be continuously varied according to the volume of air included in the air chamber. In a structure that the auxiliary air chamber 13 connects with the primary air chamber 12, the body height is varied according to the total volume of air included in the primary and the auxiliary air chambers 12 and 13.

Each auxiliary air chamber 13 is connected to or disconnected from the primary air chamber 12 through on-off operations of a valve mounted on an actuator 15. The auxiliary air chamber 13 cooperates with the primary air chamber 12 to change the spring constant relative to the vertical movement of the body between two stages (large and small).

A supply-discharge apparatus for supplying and discharging the air is connected to the primary air chambers 12. The supply-discharge apparatus includes a compressor 17 driven by a power-driven motor 16, a first check valve 18, an air dryer 19, a second check valve 21, and an orifice 22, where the second check valve 21 and the orifice 22 are arranged in parallel. The supply-discharge apparatus is diversified after the second check valve 21 and the orifice 22 to connect with the primary air chambers 12a through 12d. First solenoid-operated switch valves 23a through 23d are disposed at branch pipes respectively connecting with the primary air chambers 12a through 12d, while a second solenoid-operated switch valve 24 is arranged in a conduit between the first check valve 18 and the air dryer 19. The air is supplied into or discharged from the primary air chambers 12a through 12d through on-off operations of the first solenoid-operated switch valves 23a–23d and the second solenoid-operated switch valve 24. The adjustment of body height by means of the primary air chambers 12 is not directly related to the essential characteristics of the present invention, and the description of an adjustment process is thus omitted here.

A microcomputer 37 controls the stepping motor 14, the actuator 15, the first solenoid-operated switch valves 23, and the second solenoid-operated switch valve 24. The microcomputer 37 is constructed as a logic operation circuit including a CPU, a ROM, a RAM, and a back-up RAM, and drives the stepping motor 14 and the other elements based on detection signals from various sensors and switches to control the damping force or the body height. As shown in FIG. 1, the microcomputer 37 connects with stroke sensors 31 mounted on the respective wheels, a mode switch 32, a brake switch 33, a steering angle sensor 34, a vehicle speed sensor 35, a yaw rate sensor 36, a throttle valve travel sensor 38, a shift sensor 39, and a vertical acceleration (vertical G) sensor 41.

Each stroke sensor 31 disposed at the corresponding wheel detects a displacement of body height at the position of the wheel and outputs a signal representing the displacement. The mode switch 32 is operated by a driver to selectively change the suspension characteristics from a normal mode to a sports mode or vice versa and outputs a signal representing the suspension characteristics. The brake switch 33 detects a step-on operation of a brake pedal (not shown). The brake switch 33 is generally in OFF state and outputs an ON signal in response to a step-on operation of the brake pedal. The steering angle sensor 34 detects a steering angle $\theta$ of a steering wheel (not shown) or the front wheels and outputs a signal representing the steering angle $\theta$. The vehicle speed sensor 35 detects a speed V of the vehicle and outputs a signal representing the speed V. The yaw rate sensor 36 detects a yaw rate of the body and outputs a detection signal representing the yaw rate. The throttle valve travel sensor 38 detects a valve travel of a throttle coupled with an accelerator pedal (not shown) and outputs a signal representing the valve travel. The shift sensor 39 is incorporated in a gearshift device (not shown) and outputs an ON signal in response to a gear shift from Neutral to Drive. The vertical G sensor 41 detects an acceleration of vertical movement acting on the body (mass body) and outputs a signal representing the acceleration.

Figure 2:
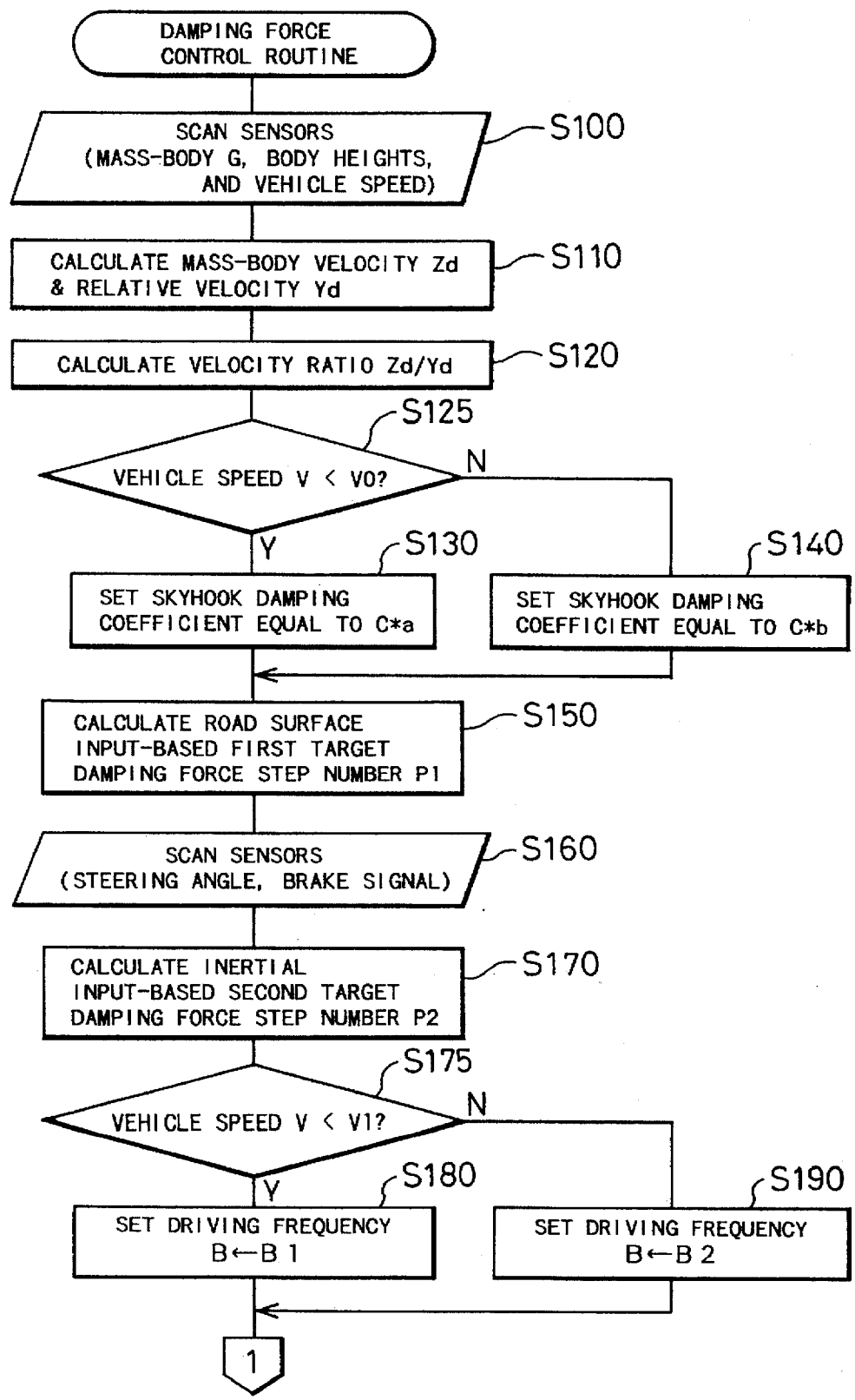
FIGS. 2 and 3 are flowcharts showing a routine of varying and controlling the damping force executed by the suspension control system 10 of the first embodiment.
Figure 3:
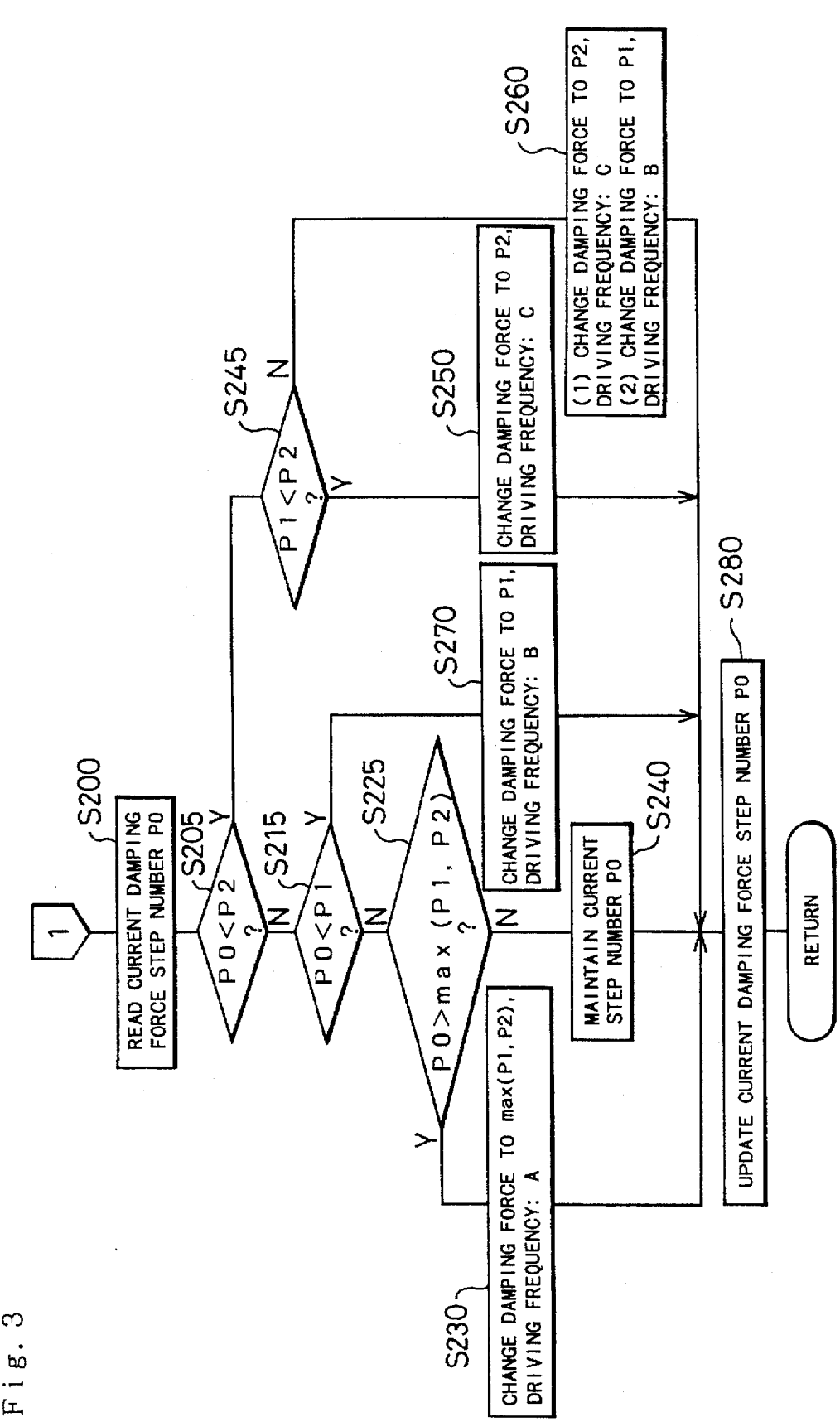

The flowcharts of FIGS. 2 and 3 show a routine of varying and controlling the damping force executed by the suspension control system 10 of the first embodiment thus constructed.

The routine of FIGS. 2 and 3 starts when an ignition key (not shown) is turned ON, and is repeatedly executed until the ignition key is turned OFF. In response to a power-ON operation, an internal register of the CPU is cleared and required initial processing is executed prior to a start of this routine.

After the initial processing, the CPU scans the vertical G sensor 41, the stroke sensors 31, and the vehicle speed sensor 35 to obtain detection signals required for varying the damping force according to a velocity ratio Zd/Yd of a mass-body velocity Zd to a relative velocity Yd at step S100. These detection signals represent an acceleration of vertical movement acting on the mass body, displacements in body height for the respective wheels, and a vehicle speed V. The CPU calculates the mass-body velocity Zd and the relative velocity Yd from the acceleration of vertical movement and the displacements in body height at step S110 and subsequently determines the velocity ratio Zd/Yd at step S120.

Figure 4:
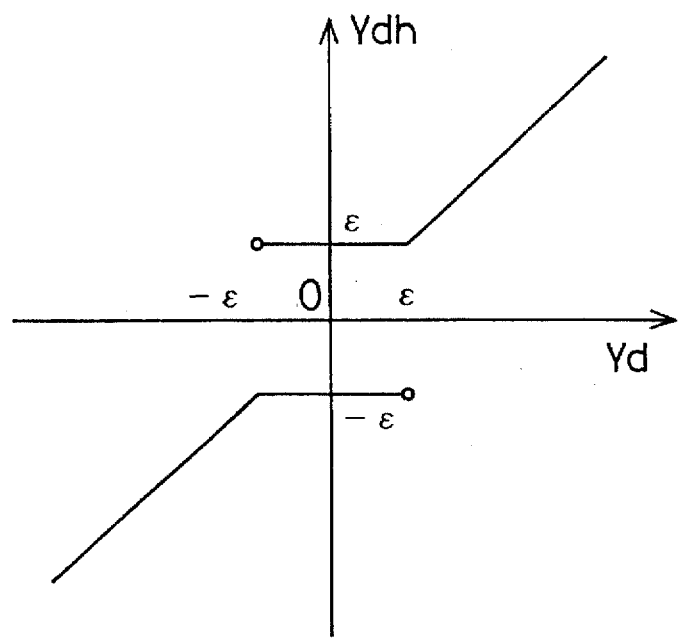
FIG. 4 is a graph showing a process executed at step S120 in the flowchart of FIG. 2.

In calculation of the velocity ratio Zd/Yd at step S120, the relative velocity Yd in the vicinity of the value 'zero' is corrected in the following manner. When the relative velocity Yd obtained at step S110 ranges from $-\epsilon$ to $\epsilon$ in the vicinity of zero as shown in FIG. 4, the relative velocity Yd used for determination of the velocity ratio Zd/Yd is uniformly set equal to either $\epsilon$ or $-\epsilon$. The value $\epsilon$ or $-\epsilon$ is selected according to the variation of the relative velocity Yd calculated. The relative velocity Yd is set equal to $\epsilon$ when the relative velocity Yd decreases from a positive value to be in the range of $\epsilon$ to $-\epsilon$. The relative velocity Yd is set equal to $-\epsilon$, on the contrary, when the relative velocity Yd increases from a negative value to be in the range of $-\epsilon$ to $\epsilon$. A map corresponding to the graph of FIG. 4 is previously stored in the ROM of the microcomputer 37.

Figure 5:
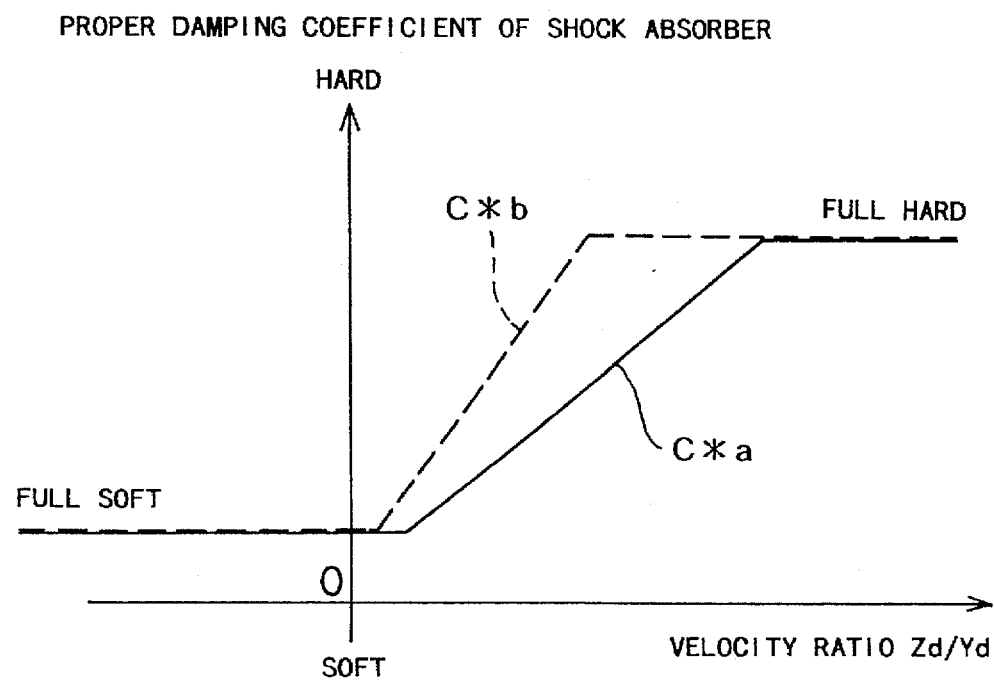
FIG. 5 is a graph showing a process executed at steps S130 and S140 in the flowchart of FIG. 2.

After the calculation at step S120, the program proceeds to step S125 at which the vehicle speed V read at step S100 is compared with a predetermined first low speed V0 (for example, 70 km/h). When the vehicle speed V is less than the predetermined first low speed V0 at step S125, the program goes to step S130 at which a skyhook damping coefficient of each shock absorber 11 is switched to C*a as shown in FIG. 5. When the vehicle speed V is equal to or greater than the predetermined first low speed V0 at step S125, on the other hand, the program goes to step S140 at which the skyhook damping coefficient is switched to a general value C*b. The skyhook damping coefficient representing a degree of variation in damping force between Full Soft and Full Hard is set to the smaller value C*a for the low vehicle speed. This controls the degree of variation in damping force and prevents an extreme change of the damping force. The skyhook damping coefficient is returned to the general value C*b for the high vehicle speed.

The program then proceeds to step S150 at which a first target damping force step number P1 based on an input of road surface condition is determined using the velocity ratio Zd/Yd obtained and the graph of FIG. 5. The target damping force step number represents a stop position of the stepping motor 14. The step number corresponds to the valve travel of the shock absorber 11. The larger step number corresponds to the smaller valve travel and represents a stop position to control the damping characteristics to a harder state.

The CPU then scans the brake switch 33 and the steering angle sensor 34 to obtain detection signals required for varying the damping force according to a change in attitude of the vehicle at step S160. The CPU receives data of the steering angle $\theta$ and the brake signal, which are inertial inputs causing an attitude change of the vehicle. At step S170, a second target damping force step number P2 based on these inertial inputs is calculated from roll and dive conditions as described below.

Figure 6:
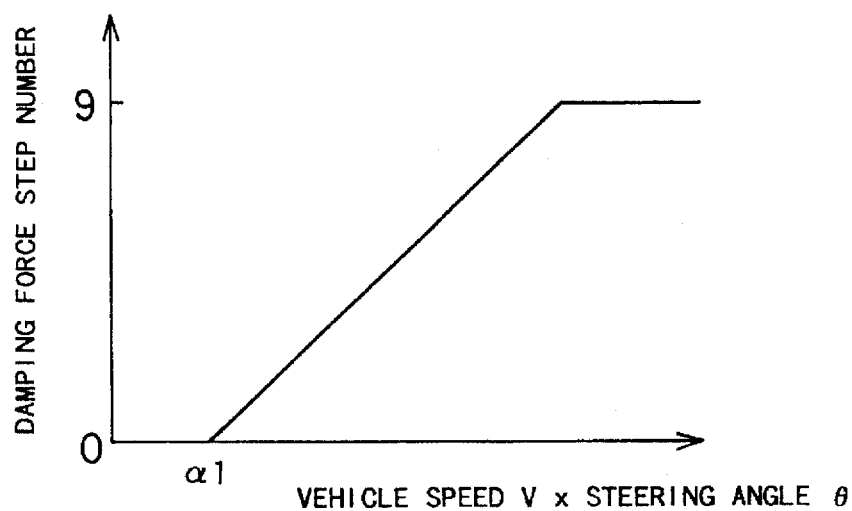
FIG. 6 is a graph showing the damping force step number plotted against the product of the vehicle speed V and the steering angle θ.

The CPU determines a turning condition of the vehicle, that is, abrupt or slow turning, based on the steering angle $\theta$ from the steering angle sensor 34 and the vehicle speed v from the vehicle speed sensor 35, and calculates a step number of damping force (anti-roll) required for restraining the change in attitude of the vehicle under the abrupt or slow turning condition. Calculation of the damping force step number is based on a map corresponding to a graph showing the damping force step number plotted against the product of the vehicle speed V and the steering angle $\theta$ as shown in FIG. 6. The damping force step number calculated for anti-roll gradually increases to 9 at the maximum, as the product of the vehicle speed V and the steering angle $\theta$ exceeds a predetermined value $\alpha1$ to show a greater roll. The calculation of the damping force step number for anti-roll may be based on the product of the vehicle speed V and a steering angular velocity, instead of the product of the vehicle speed V and the steering angle $\theta$.

Figure 7:
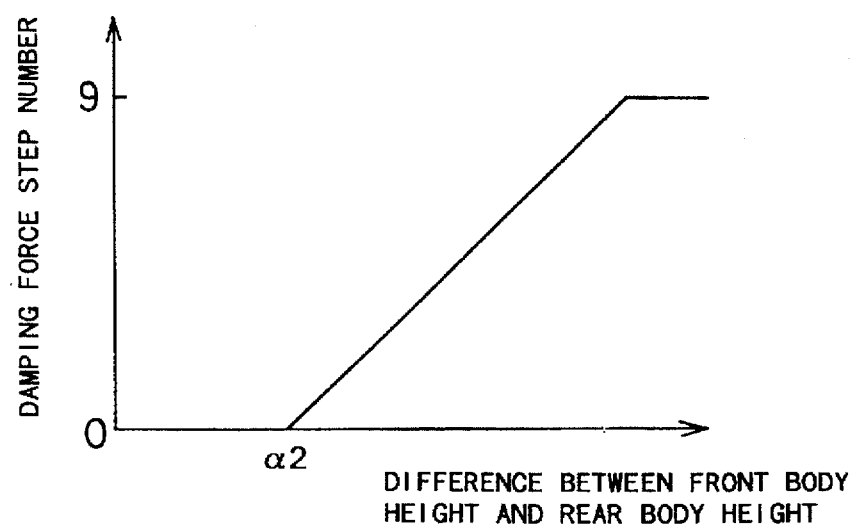
FIG. 7 is a graph showing the damping force step number plotted against the difference between the front body height and the rear body height.

The CPU also determines an abrupt or gentle dive condition representing a difference between the front body height and the rear body height of the vehicle, based on the brake signals from the brake switch 33 and the vehicle speed V from the vehicle speed sensor 35, and calculates a step number of damping force (anti-dive) required for restraining the change in attitude of the vehicle under the abrupt or gentle drive condition. Calculation of the damping force step number is based on a map corresponding to a graph showing the damping force step number plotted against the difference between the front body height and the rear body height as shown in FIG. 7. The damping force step number calculated for anti-dive gradually increases to 9 at the maximum, as the difference between the front body height and the rear body height exceeds a predetermined value $\alpha2$ to show a greater dive. The difference between the front body height and the rear body height may be determined using the detection signals from the stroke sensors 31a through 31d mounted for the respective wheels. Alternatively, the difference between a front acceleration and a rear acceleration of the vehicle may be used instead of the difference between the front body height and the rear body height.

The greater of the damping force step number calculated for anti-roll and that for anti-dive is set as the second target damping force step number P2 at step S170. According to a modified application, another damping force step number calculated for anti-squat is a possible alternative of the inertial input-based damping force step number, in addition to the damping force step numbers for anti-roll and anti-dive. In this case, the greatest of the three damping force step numbers is set as the second target damping force step number P2 at step S170.

Figure 8:
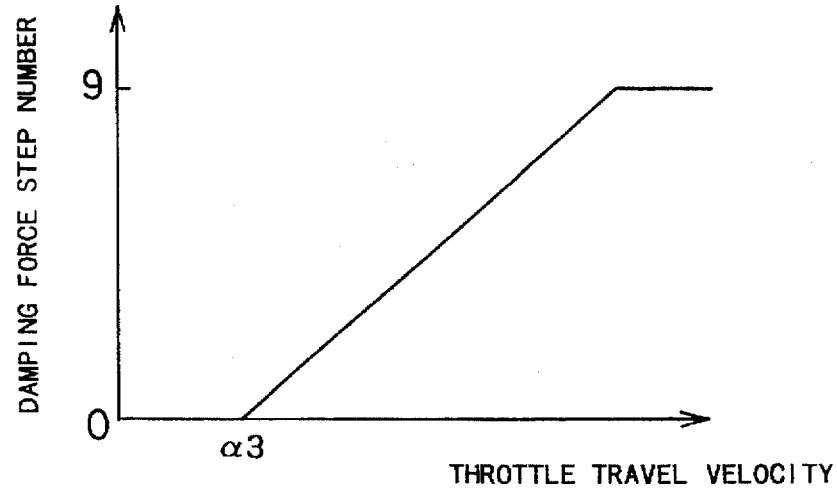
FIG. 8 is a graph showing the damping force step number plotted against the throttle travel velocity.

In order to calculate the damping force step number for anti-squat, the CPU determines an abrupt or gentle squat condition based on the throttle travel velocity, which is obtained from a detection signal output from the throttle valve travel sensor 38, and calculates a step number of damping force (anti-squat) required for restraining the change in attitude of the vehicle under the abrupt or gentle squat condition. Calculation of the damping force step number is based on a map corresponding to a graph showing the damping force step number plotted against the throttle travel velocity as shown in FIG. 8. The damping force step number calculated for anti-squat gradually increases to 9 at the maximum, as the throttle travel velocity exceeds a predetermined value α3 to show a greater squat. In a preferable structure, the throttle travel velocity is corrected with the vehicle speed V from the vehicle speed sensor 35, and the damping force step number is calculated from the corrected throttle travel velocity. Alternatively, the difference between a front acceleration and a rear acceleration of the vehicle may be used instead of the throttle travel velocity.

After the second target damping force step number P2 is calculated at step S170, the program goes to step S175 at which the vehicle speed v is compared with a predetermined second low speed V1 (for example, 50 km/h). The predetermined second low speed V1 may be equal to the predetermined first low speed V0 used at step S125. When the vehicle speed V is less than the predetermined second low speed V1 at step S175, the program goes to step S180 at which a driving frequency B of the stepping motor 14 is set equal to B1 in order to change the damping force of the shock absorber 11 to a harder state. When the vehicle speed V is equal to or greater than the predetermined second low speed V1 at step S175, on the contrary, the program goes to step S190 at which the driving frequency B is set equal to a generally used driving frequency B2 (>B1). While the vehicle speed is low, the stepping motor 14 is driven at the driving frequency B1 lower than the general driving frequency B2. This lowers a rate of variation in damping force of the shock absorber 11 and allows the damping force to be changed to a harder state at a relatively low speed. The stepping motor 14 is driven at the general driving frequency B2 for the high vehicle speed, so that the damping force is changed to a harder state at a standard rate.

After the selection of driving frequency, the CPU reads a current damping force step number P0 previously stored in the RAM at step S200 in the flowchart of FIG. 3. The current damping force step number P0 is compared successively with the inertial input-based second target damping force step number P2 obtained at step S170 (step S205), with the road surface input-based first target damping force step number P1 obtained at step S150 (step S215), and with a maximum target damping force step number max(P1,P2), which is the greater of the first target damping force step number P1 and the second target damping force step number P2 (step S225). The process at steps S205, S215, and S225 determines whether the damping force is to be changed to a harder state, to be changed to a softer state, or not required to change.

When the answer is negative at both steps S205 and S215, the current damping force step number P0 is equal to or greater than the first target damping force step number P1 and the second target damping force step number P2. This means that the damping force is not required to change at least from Soft to Hard. When the answer is affirmative at the subsequent step S225, the current damping force step number P0 exceeds the maximum target damping force step number max(P1,P2). This means that the damping force is to be changed to a softer state. After the affirmative answer at step S225, the program proceeds to step S230 at which the stepping motor 14 is driven at a driving frequency A in order to change the damping force to a softer state to be equal to a value corresponding to the maximum target damping force step number max(P1,P2). The stepping motor 14 is driven and rotated to decrease the damping force by a difference between the maximum target damping force step number max(P1,P2) and the current damping force step number P0. The driving frequency A of the stepping motor 14 for changing the damping force to a softer state is constant irrespective of the vehicle speed V, and smaller than the driving frequency B1 for changing the damping force to a harder state. This allows the damping force to be gently changed to a softer state.

The negative answers at all the steps S205, S215, and S225 mean that the current damping force step number P0 is equal to the maximum target damping force step number max(P1,P2). When the answer is negative at step S225, the program goes to step S240 at which the stepping motor 14 is not driven to remain the current damping force step number P0.

When the answer is affirmative at step S205, on the other hand, the program goes to step S245 at which the road surface input-based first target damping force step number P1 is compared with the inertial input-based second target damping force step number P2. The affirmative answer at step S205 indicates a change of the damping force to a harder state. The subsequent process differs depending upon which is greater, P1 or P2. When P1 is smaller than P2 at step S245, the program goes to step S250 at which the stepping motor 14 is driven at a driving frequency C (>B2) in order to change the damping force to a harder state to be equal to a value corresponding to the inertial input-based second target damping force step number P2. The stepping motor 14 is driven and rotated to increase the damping force by a difference between the second target damping force step number P2 and the current damping force step number P0. The damping force of the shock absorber 11 is accordingly changed to a damping force corresponding to the second target damping force step number P2, which is not less than the road surface input-based first target damping force step number P1.

When P1 is equal to or greater than P2 at step S245, on the contrary, the program proceeds to step S260 at which the damping force is changed in two stages to eventually reach a value corresponding to the road surface input-based first target damping force step number P1. In a first stage, the stepping motor 14 is driven at the driving frequency C (>B2) until the damping force changes to a harder state to be equal to a value corresponding to the second target damping force step number P2. In a second stage, the stepping motor 14 is driven at another driving frequency B until the damping force further changes to a harder state to be equal to a value corresponding to the first target damping force step number P2. The driving frequency B of the stepping motor 14 set at step S260 is identical with either one of the driving frequencies B1 and B2 determined respectively at steps S180 and S190 according to the vehicle speed V. When the vehicle speed V is not greater than the predetermined second low speed V1, the stepping motor 14 is driven at the lower driving frequency B1 to change the damping force from the second target damping force step number P2 to the first target damping force step number P1. When the vehicle speed V is greater than the predetermined second low speed V1, on the contrary, the stepping motor 14 is driven at the higher driving frequency B2 to change the damping force from the second target damping force step number P2 to the first target damping force step number P1.

Figure 9:
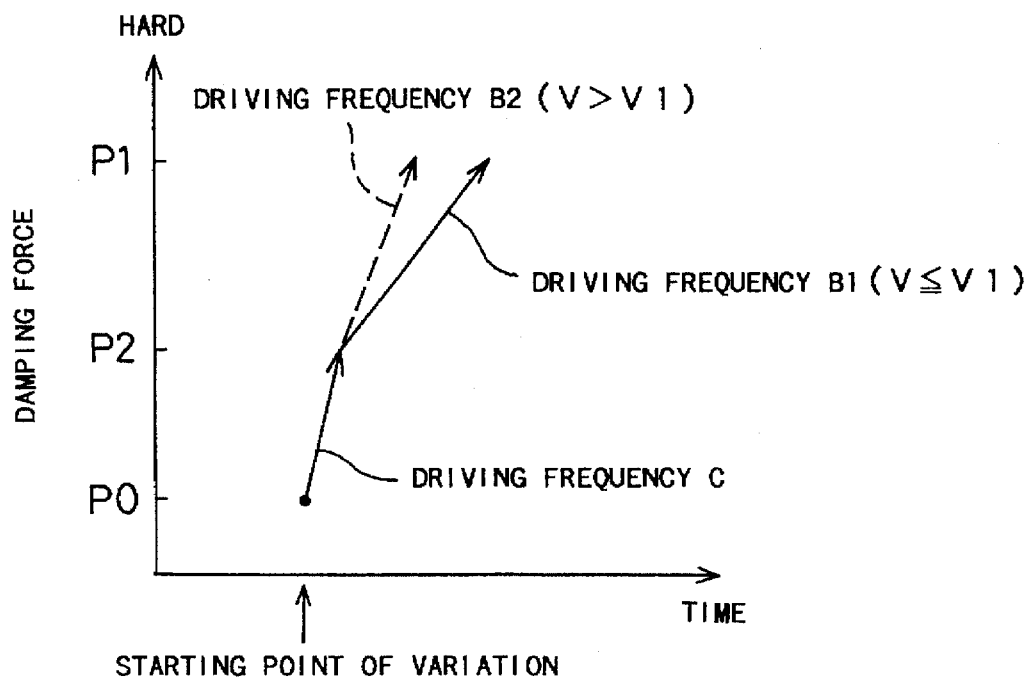
FIG. 9 is a graph showing a variation in damping force by the damping force control routine of the first embodiment.
Figure 10:
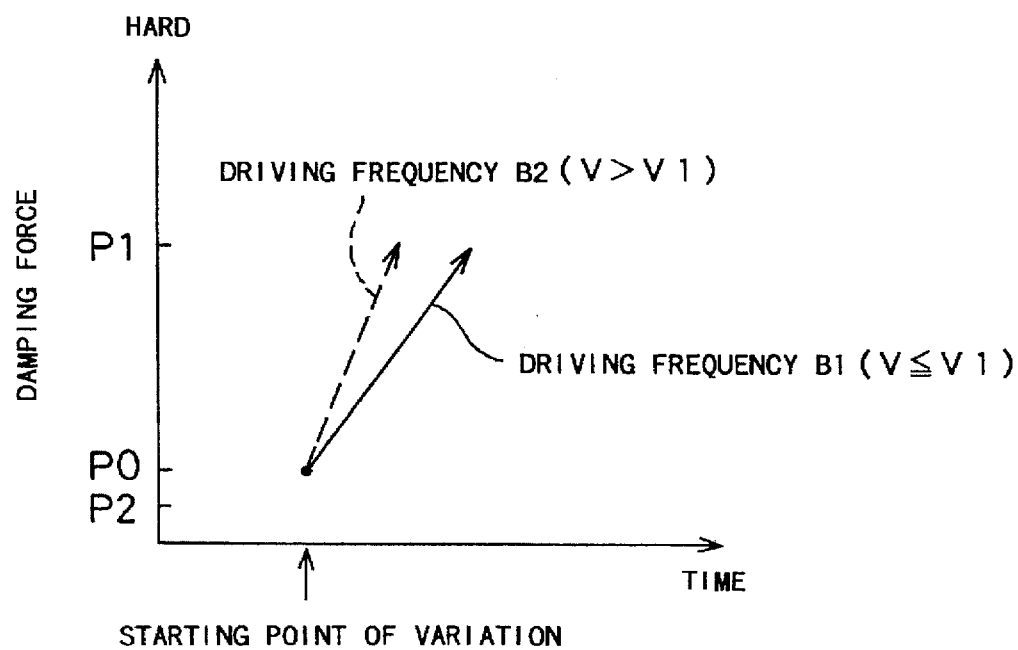
FIG. 10 is a graph showing a variation in damping force by the damping force control routine of the first embodiment.

FIG. 9 shows a variation in damping force with the elapse of time. The stepping motor 14 is driven at the driving frequency C (>B2) irrespective of the vehicle speed V until the current damping force step number P0 becomes equal to the second target damping force step number P2. Until the damping force changes from the second target damping force step number P2 to the first target damping force step number P1, the stepping motor 14 is driven at the lower driving frequency B1 for the vehicle speed V of not greater than the predetermined second low speed V1 or driven at the higher driving frequency B2 for the vehicle speed V of greater than the predetermined second low speed V1. Under the former condition, the damping force changes to a harder state at a relatively slow rate up to the road surface input-based first target damping force step number P1. Under the latter condition, on the other hand, the damping force changes to a harder state at a rather high rate up to the first target damping force step number P1.

When the answer is affirmative at step S215, the damping force changes to a harder state, like the case of affirmative answer at step S205. The negative answer at step S205 (P0≧P2) and the affirmative answer at step S215 (P0<P1) give an inequality of P1>P0≧P2. Under such condition, the damping force changes to a harder state from the current damping force step number P0 to the first target damping force step number P1. The stepping motor 14 is thus driven at the driving frequency B to change the damping force to a harder state up to a value corresponding to the first target damping force step number P1 at step S270. Like the processing at step S260, the driving frequency B of the stepping motor 14 set at step S270 is identical with either one of the driving frequencies B1 and B2 according to the vehicle speed V. When the vehicle speed V is not greater than the predetermined second low speed V1, the stepping motor 14 is driven at the lower driving frequency B1 to change the damping force to a harder state at a relatively slow rate up to the road surface input-based first target damping force step number P1. When the vehicle speed V is greater than the predetermined second low speed V1, on the other hand, the stepping motor 14 is driven at the higher driving frequency B2 to change the damping force to a harder state at a rather high rate up to the first target damping force step number P1.

After the process at any one of steps S230, S240, S250, S260, and S270, the program goes to step S280 at which the CPU writes the current damping force step number P0, the first target damping force step number P1, or the second target damping force step number P2 as the current damping force step number P0 in the back-up RAM. The program then exits from the routine and resumes the process at step S100.

In the suspension control system 10 of the first embodiment described above, in operation of the road surface input-based first target damping force step number P1 according to the velocity ratio Zd/Yd of the mass-body velocity Zd to the relative velocity Yd, the skyhook damping coefficient of each shock absorber 11 is set equal to C*a for the low vehicle speed V (step S130). While the vehicle runs at a relatively low speed, the road surface input-based first target damping force step number P1 decreases according to the velocity ratio Zd/Yd so as to restrict the degree of variation in damping force and prevent an extreme change of the damping force. In low-speed cruising when the driver is relatively sensitive to the drive comfort, the suspension control system 10 of the embodiment relieves shocks or uncomfortableness due to a delayed control of damping force, which is caused by a delayed detection of the relative velocity or a delayed response of devices, so as to substantially maintain drive. For the high vehicle speed, on the contrary, the skyhook damping coefficient is set equal to C*b, which is greater than C*a (step S140), so that the road surface input-based first target damping force step number P1 is suited for the velocity ratio Zd/Yd. In high-speed cruising when the driver is more caught by the speed but relatively insensitive to drive comfort, the suspension control system 10 of the embodiment varies the damping force to a greater extent than that for the low-speed cruising to be suited for the velocity ratio, thus ensuring stable cruising.

When the vehicle speed V is relatively low, the driving frequency B1 lower than the general level is set as the driving frequency B of the stepping motor 14 for varying the damping force of the shock absorber 11 (step S180), thereby varying the damping force at a relatively slow rate (step S270). In low-speed cruising when the driver is relatively sensitive to drive comfort, the stepping motor 14 is driven at the lower driving frequency B1 to lower a rate of variation in damping force, so as to relieve shocks or uncomfortableness due to a delayed control of damping force, which is caused by a delayed detection of the relative velocity or a delayed response of devices, and substantially maintain a comfortable drive. In high-speed cruising when the driver is more caught by the speed but relatively insensitive to drive comfort, on the other hand, the stepping motor 14 is driven at the higher driving frequency B2 to vary the damping force quickly and ensure stable cruising.

In response to an inertial input from the brake switch 33 and the steering angle sensor 34 for causing a varied attitude of the vehicle, the CPU determines the inertial input-based second target damping force step number P2 (step S170). When the inertial input-based second target damping force step number P2 is greater than the road surface input-based first target damping force step number P1, the damping force is changed to be a value corresponding to the second target damping force step number P2 (step S250). At this moment, the stepping motor 14 is driven at the driving frequency C, which is higher than the general driving frequency B2 (step S250). In response to a driving operation with a steering wheel or brake pedal to cause an attitude change of the vehicle, the suspension control system 10 of the first embodiment varies the damping force according to the attitude change without delay, thus effectively compensating the attitude change and ensuring stable cruising. During such a driving operation, the driver is relatively insensitive to drive comfort and rather unconscious of shocks or uncomfortableness due to a swift change of the damping force.

For a slight degree of operation of the steering wheel or brake pedal, the damping force for reducing the vibrations based on an input of road surface condition is predominant over the damping force for controlling the attitude change (P2<P1). At this moment, the stepping motor 14 is driven at the driving frequency B1 or B2, either of which is lower than the driving frequency C. In case of a slight attitude change, the rate of variation in damping force is lowered so as to relieve shocks or uncomfortableness due to a delayed control of damping force, which is caused by a delayed detection of the relative velocity or a delayed response of devices, and substantially maintain a comfortable drive.

The suspension control system 10 of the first embodiment ensures both a comfortable drive and stable cruising in the course of a variation in damping force according to the velocity ratio Zd/Yd.

In the structure of the first embodiment, even when the road surface input-based first target damping force step number P1 is greater than and predominant over the inertial input-based second target damping force step number P2, the stepping motor 14 is driven at the high driving frequency C until the damping force changes to a value corresponding to the second target damping force step number P2 (first stage of step S260). The stepping motor 14 is subsequently driven at the driving frequency B1 or B2 corresponding to the vehicle speed V (second stage of step S260). This structure allows the suspension control system 10 of the embodiment to further ensure both a comfortable drive and the stable cruising. When the damping force changes to a softer state, the stepping motor 14 is driven at the lower driving frequency A. Such a slow change in damping force maintains a comfortable drive.

Figure 11:
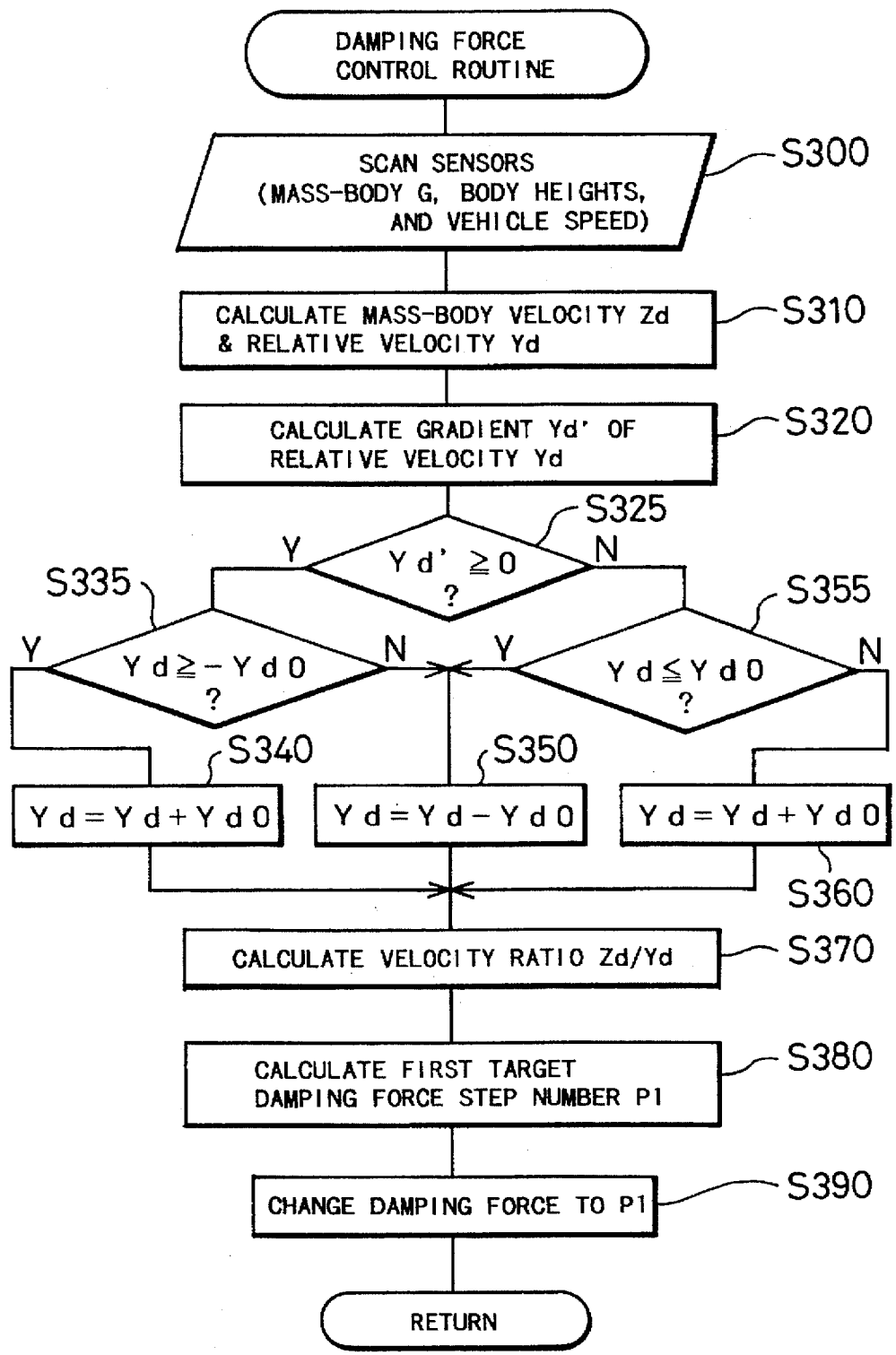
FIG. 11 is a flowchart showing a routine of varying and controlling the damping force executed by another suspension control system 10' of a second embodiment according to the invention.

FIG. 11 is a flowchart showing a routine for varying and controlling the damping force by another suspension control system 10' of a second embodiment according to the invention. The suspension control system 10' of the second embodiment has substantially similar structure to that of the suspension control system 10 of the first embodiment. The difference from the first embodiment is that the second embodiment corrects the relative velocity Yd to make a zero-cross point of the relative velocity Yd coincident with an actual value. Only the different structure of the second embodiment is described below.

In the flowchart of FIG. 11, like the first embodiment, the CPU scans the vertical G sensor 41, the stroke sensors 31, and the vehicle speed sensor 35 at step S300 and calculates the mass-body velocity Zd and the relative velocity Yd at step S310. The relative velocity Yd thus obtained is stored in the RAM. The relative velocity Yd calculated at step S310 is hereinafter referred to as the calculated relative velocity Yd.

After the process at step S310, the program proceeds to step S320 at which a gradient Yd' (rate of variation) of calculated relative velocity Yd is obtained from a difference between the current calculated relative velocity Yd obtained in the current cycle of this routine and a previous calculated relative velocity Yd stored in the previous cycle of this routine. It is then determined at step S325 whether the gradient Yd' of calculated relative velocity Yd is not less than zero. The answer at step S325, the calculated relative velocity Yd obtained at step S310, and the gradient Yd' of calculated relative velocity Yd obtained at step S320 determine a variation in calculated relative velocity Yd and thereby a variation in actual relative velocity of the vehicle. This is ascribed to the following reasons.

Figure 12:
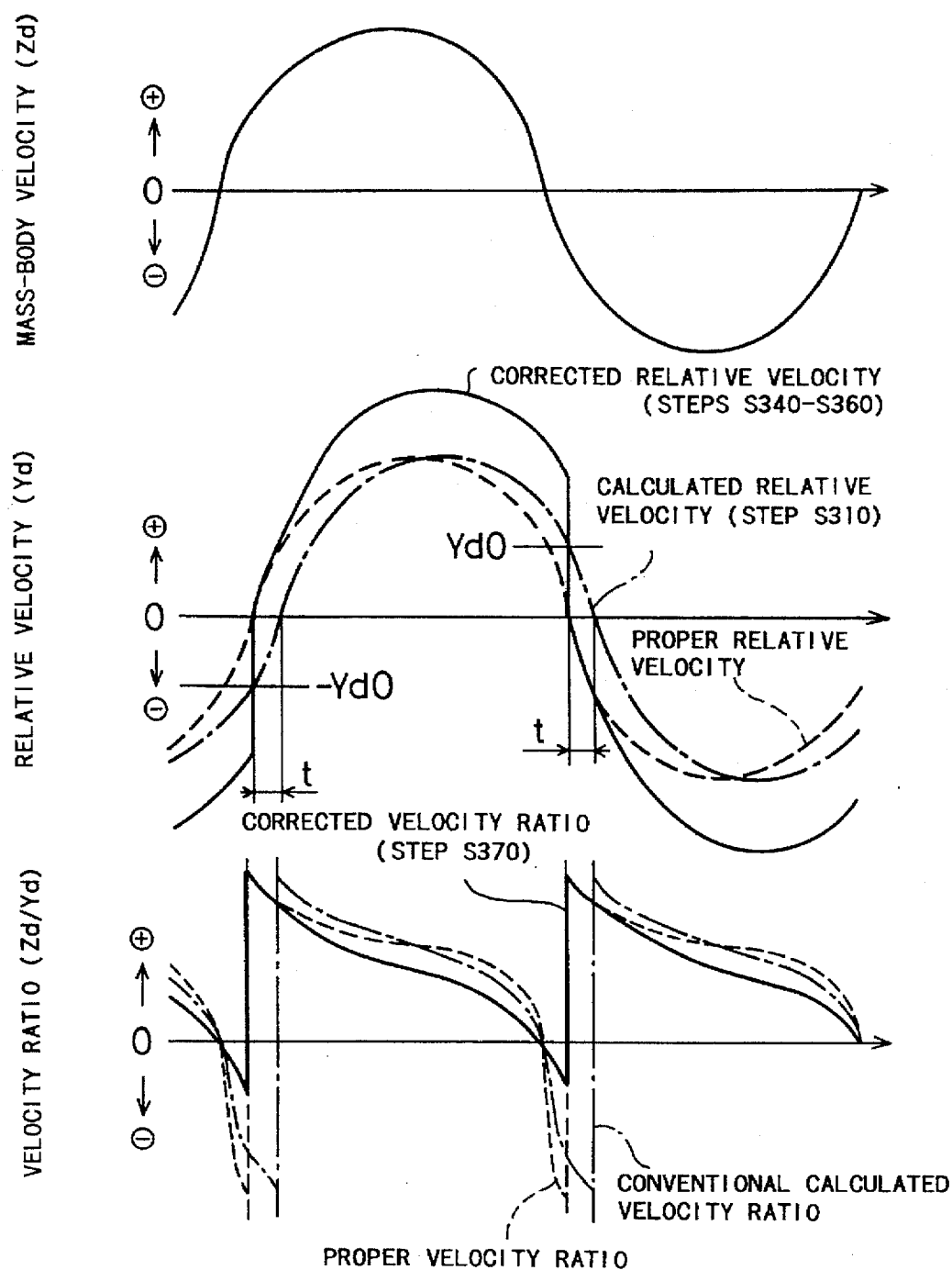
FIG. 12 shows the processing and effects of the damping force control routine of the second embodiment.

The calculated relative velocity Yd is obtained from the detection signals of the sensors and thus shows a value of actual relative velocity with a delay of a predetermined time t due to a delayed response or delayed detection of the sensors and other devices. The gradient Yd' of calculated relative velocity Yd also represents a gradient of actual relative velocity with a delay of the predetermined time t. When the actual relative velocity (proper relative velocity) varies as a curve of dotted line in the middle graph of FIG. 12, the calculated relative velocity Yd follows the curve of actual relative velocity with a delay of the predetermined time t as shown by a curve of one-dot chain line. This means that the variation in calculated relative velocity Yd represents the variation in actual relative velocity on the vehicle, irrespective of a delay of the predetermined time t. The upper graph of FIG. 12 shows a variation in mass-body velocity Zd.

When the answer is affirmative at step S325, that is, when the gradient Yd' of calculated relative velocity Yd is not less than zero, the calculated relative velocity Yd is in the process of rising, at a start of rising, or at an end of rising. The actual relative velocity was accordingly at a start or end of rising or in the process of rising before the predetermined time t. In response to the affirmative answer at step S325, the program goes to step S335 at which the calculated relative velocity Yd is compared with a first reference value −Yd0 (Yd0 is positive). The first reference value −Yd0 is previously determined by an experiment or the like by considering the delay of predetermined time t between the calculated relative velocity Yd and the actual relative velocity. The calculated relative velocity Yd coincides with the first reference value −Yd0 when the actual relative velocity becomes equal to zero in any of the above process.

When the calculated relative velocity Yd is not less than the first reference value −Yd0 at step S335, the program goes to step S340 at which the calculated relative velocity Yd is corrected by adding Yd0 to the calculated relative velocity Yd. When the calculated relative velocity Yd is less than the first reference value −Yd0 at step S335, on the contrary, the program goes to step S350 at which the calculated relative velocity Yd is corrected by subtracting Yd0 from the calculated relative velocity Yd.

When the answer is negative at step S325, that is, when the gradient Yd' of calculated relative velocity Yd is negative, the calculated relative velocity Yd is in the process of falling, at a start of falling, or at an end of falling. The actual relative velocity was accordingly at a start or end of falling or in the process of falling before the predetermined time t. In response to the negative answer at step S325, the program goes to step S355 at which the calculated relative velocity Yd is compared with a second reference value Yd0. The second reference value Yd0 is previously determined by an experiment or the like by considering the delay of predetermined time t between the calculated relative velocity Yd and the actual relative velocity. The calculated relative velocity Yd coincides with the second reference value Yd0 when the actual relative velocity becomes equal to zero in any of the above process.

When the calculated relative velocity Yd is greater than the second reference value Yd0 at step S355, the program goes to step S360 at which the calculated relative velocity Yd is corrected by adding Yd0 to the calculated relative velocity Yd. When the calculated relative velocity Yd is not greater than the second reference value Yd0 at step S355, on the contrary, the program goes to step S350 at which the calculated relative velocity Yd is corrected by subtracting Yd0 from the calculated relative velocity Yd.

The corrected relative velocity Yd obtained by correcting the calculated relative velocity Yd at steps S325 through S360 follows a curve of solid line given in the middle graph of FIG. 12.

After the process at step S340, S350, or S360, the program proceeds to step S370 at which the CPU calculates the velocity ratio Zd/Yd of the mass-body velocity Zd obtained at step S310 to the corrected relative velocity Yd. The CPU then determines the first target damping force step number P1 according to the results of calculation at step S380. Like step S120 in the first embodiment, when the relative velocity Yd ranges from −ϵ to ϵ in the vicinity of zero, the relative velocity Yd is uniformly set equal to either ϵ or −ϵ at step S370 (see FIG. 4). A skyhook damping coefficient is used for the calculation of the first target damping force step number P1 at step S380. The skyhook damping coefficient used here is determined according to the velocity ratio Zd/Yd by considering a difference between the corrected relative velocity Yd and the calculated relative velocity Yd as shown in FIG. 12.

After the calculation of the first target damping force step number P1, the stepping motor 14 is driven to change the damping force to a value corresponding to the first target damping force step number P1 (step S390). The program then exits from the routine and resumes the process at step S300.

The suspension control system 10' of the second embodiment described above corrects the calculated relative velocity Yd obtained from the detection signals of the sensors (see the middle graph of FIG. 12) and applies the corrected relative velocity Yd for the calculation of the velocity ratio Zd/Yd of the mass-body velocity Zd to the relative velocity Yd, which is used as a basis of varying and controlling the damping force according to the skyhook control theory. The corrected relative velocity Yd becomes equal to zero before the calculated relative velocity rises or falls to reach zero. The zero-cross point of the corrected relative velocity Yd coincides with the zero-cross point of the actual relative velocity (see the middle and lower graphs of FIG. 12).

In the suspension control system 10' of the second embodiment, the timing of a variation in damping force coincides with the timing in the skyhook control theory. The structure of the second embodiment accordingly relieves shocks or uncomfortableness due to a variation in damping force from Full Soft to Hard and substantially maintains a comfortable drive, while varying the damping force according to the velocity ratio Zd/Yd not to damage stable cruising. This means that the suspension control system 10' of the second embodiment ensures both a comfortable drive and stable cruising.

In the structure of the second embodiment, the corrected relative velocity Yd is discontinuous only when the calculated relative velocity Yd is identical with either the first reference value −Yd0 or the second reference value Yd0. The corrected relative velocity Yd is continuous otherwise. In the continuous domain, a pre-fixed relationship holds between the velocity ratio Zd/Yd obtained from the corrected relative velocity Yd and the velocity ratio Zd/Yd from the calculated relative velocity Yd. This relationship, for example, gives a difference of −Yd0 between the calculated relative velocity Yd and the corrected relative velocity Yd. The skyhook damping coefficient used for calculation of the damping force according to the velocity ratio Zd/Yd using the corrected relative velocity Yd is accordingly determined by considering the relationship between the velocity ratio Zd/Yd and Zd/(Yd±Yd0), which reflects the difference of Yd0. This allows the damping force of the shock absorber 11 to be controlled according to the velocity ratio of the mass-body velocity to the relative velocity.

Although the invention is described according to the embodiments, the above embodiments are only illustrative and not restrictive in any sense. There may be many modifications, alterations, and changes without departing from the scope or spirit of essential characteristics of the invention. Examples of some modification are given below.

In the first embodiment, for example, the skyhook damping coefficient is changed between two stages according to the vehicle speed V (steps S130 and S140 in the flowchart of FIG. 2), and the driving frequency is selected among the two values according to the vehicle speed V (steps S180 and S190). These values may, however, be changed or selected among multiple stages according to the vehicle speed V.

The second embodiment may be constructed to change the driving frequency of the stepping motor 14 according to the vehicle speed in the process of varying the damping force up to the first target damping force step number P1.

In the second embodiment, the calculated relative velocity Yd is corrected to give substantially continuous corrected relative velocity Yd. According to another application, the calculated relative velocity Yd is corrected by addition or subtraction of Yd0, only when the calculated relative velocity Yd reaches the first reference value −Yd0 or the second reference value Yd0 prior to zero in the rising or falling process. The calculated relative velocity Yd is not corrected otherwise. The zero-cross point of the corrected relative velocity Yd is at the time of the calculated relative velocity Yd=±Yd0 and accordingly coincides with the zero-cross point of the actual relative velocity. This structure also relieves shocks or uncomfortableness due to a variation in damping force from Full Soft to Hard and substantially maintains a comfortable drive.

In the second embodiment, the corrected relative velocity Yd is obtained by adding or subtracting Yd0 to or from the calculated relative velocity Yd. The value added to or subtracted from the calculated relative velocity Yd under the condition other than Yd=±Yd0 may be varied with the elapse of time after the calculated relative velocity Yd becomes equal to ±Yd0, and the corrected relative velocity Yd is obtained using this varied value. This structure allows the curve of the corrected relative velocity Yd to be approximated by the curve of the calculated relative velocity Yd. Under such condition, an existing graph of the skyhook damping coefficient can be used for the calculation of the damping force according to the velocity ratio Zd/yd.

The scope and spirit of the present invention are limited only by the terms of the appended claims.

What is claimed is:

1. A suspension control system for controlling suspension means disposed between a mass body and a support base of a vehicle for supporting said mass body on said support base; said system comprising:

control means for varying and controlling a damping force of said suspension means according to a velocity ratio of a velocity of said mass body in a vertical direction to a relative velocity of said mass body and said support base in said vertical direction, said control means comprising:

vehicle speed detection means for detecting a speed of said vehicle;

an actuator for causing said damping force in response to a driving signal, said actuator varying said damping force at a rate corresponding to a driving frequency of said driving signal; and frequency reduction means for, when said damping force is varied and controlled according to said velocity ratio, decreasing said driving frequency of said driving signal in response to said vehicle speed detected by said vehicle speed detection means to provide a lower driving frequency at a lower vehicle speed.

2. A suspension control system in accordance with claim 1, wherein said frequency reduction means comprises:

reduction means for decreasing said driving frequency to said lower driving frequency irrespective of said vehicle speed detected by said vehicle speed detection means, when said damping force is decreased according to said velocity ratio.

3. A suspension control system for controlling suspension means disposed between a mass body and a support base of a vehicle for supporting said mass body on said support base, said system comprising:

control means for varying and controlling a damping force of said suspension means to a first damping force according to a velocity ratio of a velocity of said mass body in a vertical direction to a relative velocity of said mass body and said support base in said vertical direction, said control means comprising:

driving condition detecting means for detecting a driving condition causing a change of attitude of said vehicle; attitude change compensating means for varying and controlling said damping force of said suspension means to a second damping force different than said first damping force in response to said driving condition detected by said driving condition detecting means;

an actuator for causing said damping force in response to a driving signal, said actuator varying said damping force at a rate corresponding to a driving frequency of said driving signal; and frequency variation means for, when the damping force is varied and controlled to said second damping force by said attitude change compensating means, changing said driving frequency of said driving signal to a second driving frequency, which is higher than a first driving frequency applied for varying said damping force to said first damping force.

4. A suspension control system in accordance with claim 3, wherein said frequency variation means comprises:

damping force comparison means for comparing said first damping force with said second damping force; and frequency switching means for, when said first damping force is greater than said second damping force, setting said driving frequency of said driving signal equal to said second driving frequency until said damping force of said suspension means reaches said second damping force, and setting said driving frequency equal to said first driving frequency until said damping force of said suspension means exceeds said second damping force to reach said first damping force.

5. A suspension control system in accordance with claim 4, said suspension control system further comprising:

vehicle speed detection means for detecting a speed of said vehicle;

wherein said frequency switching means comprises:

frequency reduction means for, when said driving frequency of said driving signal is changed from said second driving frequency to said first driving frequency, decreasing said first driving frequency in response to said vehicle speed detected by said vehicle speed detection means to provide a lower driving frequency at a lower vehicle speed.

6. A suspension control system for controlling suspension means disposed between a mass body and a support base of a vehicle for supporting said mass body on said support base; said system comprising:

vertical velocity detection means for detecting a vertical velocity of said mass body in a vertical direction;

relative velocity detection means for detecting a relative velocity of said mass body and said support base in said vertical direction;

control means for varying and controlling a damping force of said suspension means to a first damping force according to a velocity ratio of said vertical velocity detected by said vertical velocity detection means to said relative velocity detected by said relative velocity detection means;

relative velocity correction means for, when said relative velocity detected by said relative velocity detection means approaches zero from a predetermined reference value, correcting said detected relative velocity in a direction of approaching zero, so as to cause said corrected relative velocity to be substantially zero when said detected relative velocity is equal to said predetermined reference value; and substitution means for substituting said corrected relative velocity for said relative velocity detected by said relative velocity detection means.

7. A suspension control system in accordance with claim 6, wherein said relative velocity correction means comprises:

variation rate distinction means for calculating a variation rate of said relative velocity detected by said relative velocity detection means and reading a sign of said variation rate; and correction means for adding said predetermined reference value to the relative velocity detected by said relative velocity detection means in response to said sign of said variation rate, thereby correcting said detected relative velocity.

* * * * *